US012198624B2

(12) United States Patent
Cho et al.

(10) Patent No.: US 12,198,624 B2
(45) Date of Patent: Jan. 14, 2025

(54) DISPLAY DEVICE AND DRIVING METHOD THEREOF

(71) Applicant: LG Display Co., Ltd., Seoul (KR)

(72) Inventors: Won Cho, Paju-si (KR); Hwa Young Kim, Paju-si (KR); Joon Min Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/040,634

(22) PCT Filed: Jul. 13, 2021

(86) PCT No.: PCT/KR2021/008958
§ 371 (c)(1),
(2) Date: Feb. 3, 2023

(87) PCT Pub. No.: WO2022/030788
PCT Pub. Date: Feb. 10, 2022

(65) Prior Publication Data

US 2023/0298524 A1 Sep. 21, 2023

(30) Foreign Application Priority Data

Aug. 5, 2020 (KR) ........................ 10-2020-0097790

(51) Int. Cl.
*G09G 3/3233* (2016.01)
*G09G 3/20* (2006.01)
*G09G 3/3225* (2016.01)

(52) U.S. Cl.
CPC ......... *G09G 3/3233* (2013.01); *G09G 3/2096* (2013.01); *G09G 3/3225* (2013.01);
(Continued)

(58) Field of Classification Search
CPC .. G09G 3/2096; G09G 3/3225; G09G 3/3233; G09G 2300/0426;
(Continued)

(56) References Cited

U.S. PATENT DOCUMENTS 8,542,166 B2 9/2013 Murata et al.
9,946,423 B2 4/2018 Shepelev et al.
(Continued)

FOREIGN PATENT DOCUMENTS

CN 103907085 A 7/2014
CN 106415456 A 2/2017
(Continued)

*Primary Examiner* — Nitin Patel
*Assistant Examiner* — Cory A Almeida
(74) *Attorney, Agent, or Firm* — Seed IP Law Group LLP

(57) ABSTRACT

A display device according to an embodiment of the specification includes a display panel including a pixel including a driving element and a light emitting device; a host system configured to render image data, which is to be applied to the pixel, change a length of a vertical blank period, and output a rendering completion signal prior to outputting the rendered image data; a timing controller configured to set a sensing period on the basis of the rendering completion signal in the vertical blank period; and a sensing circuit configured to sense an electrical characteristic of the driving element in the sensing period, wherein the sensing period starts at a first timing which is a predetermined time earlier than an end time of the vertical blank period, and a length of the predetermined time is fixed regardless of a length variation of the vertical blank period.

18 Claims, 15 Drawing Sheets

(52) U.S. Cl.
CPC ............... *G09G 2300/0426* (2013.01); *G09G 2300/0842* (2013.01); *G09G 2310/061* (2013.01); *G09G 2310/08* (2013.01); *G09G 2320/0233* (2013.01); *G09G 2320/0295* (2013.01); *G09G 2320/0626* (2013.01); *G09G 2340/0435* (2013.01); *G09G 2340/16* (2013.01)

(58) Field of Classification Search
CPC ..... G09G 2300/0842; G09G 2310/061; G09G 2310/08; G09G 2320/0233; G09G 2320/0295; G09G 2320/0626; G09G 2340/0435; G09G 2340/16
See application file for complete search history.

(56) References Cited

U.S. PATENT DOCUMENTS

| | | | |
|---|---|---|---|
| 10,691,228 | B2 | 6/2020 | Bae et al. |
| 2013/0009888 | A1 | 1/2013 | Park et al. |
| 2015/0355762 | A1 | 12/2015 | Tripathi et al. |
| 2016/0189617 | A1 | 6/2016 | Park |
| 2016/0370915 | A1 | 12/2016 | Agarwal et al. |
| 2019/0378459 | A1 * | 12/2019 | Kim ..................... G09G 3/3291 |
| 2020/0234653 | A1 | 7/2020 | Lee |

FOREIGN PATENT DOCUMENTS

| | | | |
|---|---|---|---|
| CN | 108227980 | A | 6/2018 |
| CN | 109521903 | A | 3/2019 |
| CN | 110599958 | A | 12/2019 |
| JP | 2003-528394 | A | 9/2003 |
| JP | 2008158222 | A | 7/2008 |
| JP | 2009-119263 | A | 6/2009 |
| JP | 2010-107768 | A | 5/2010 |
| JP | 2011048045 | A | 3/2011 |
| KR | 20120000887 | A | 1/2012 |
| KR | 101577907 | B1 | 12/2015 |
| KR | 20190140760 | A | 12/2019 |
| KR | 20200080783 | A | 7/2020 |
| KR | 20200081975 | A | 7/2020 |

* cited by examiner

<Nth Frame Image PROCESSING END TIME>

<N+1th Frame Image PROCESSING PERFORMING TIME>

DISPLAY DEVICE AND DRIVING METHOD THEREOF

TECHNICAL FIELD

The specification relates to an electroluminescence display device.

BACKGROUND ART

Electroluminescence display devices are categorized into inorganic light emitting display devices and electroluminescence display devices on the basis of a material of a light emitting layer. Each of a plurality of pixels of the electroluminescence display devices includes a light emitting device self-emitting light and controls the amount of light emitted by the light emitting device by using a data voltage based on a gray level of image data to adjust luminance.

Electroluminescence display devices use external compensation technology so as to increase image quality. The external compensation technology senses a pixel voltage or current based on an electrical characteristic of a pixel and modulates data of an input image on the basis of a sensed result, thereby compensating for an electrical characteristic deviation between pixels.

However, in conventional external compensation technology, when a frame frequency varies rapidly, a luminance deviation between a compensation pixel and a non-compensation pixel may increase, and due to this, a position of a compensation pixel in a display panel may be recognized by a user.

Technical Problem

Therefore, the specification provides a display device and a driving method thereof, which prevent a user from recognizing a position of a compensation pixel even when a frame frequency varies based on an input image in a process of compensating for an electrical characteristic deviation between pixels on the basis of an external compensation method.

Technical Solution

A display device according to an embodiment of the specification includes a display panel including a pixel including a driving element and a light emitting device; a host system configured to render image data, which is to be applied to the pixel, change a length of a vertical blank period, and output a rendering completion signal prior to outputting the rendered image data; a timing controller configured to set a sensing period on the basis of the rendering completion signal in the vertical blank period; and a sensing circuit configured to sense an electrical characteristic of the driving element in the sensing period, wherein the sensing period starts at a first timing which is a predetermined time earlier than an end time of the vertical blank period, and a length of the predetermined time is fixed regardless of a length variation of the vertical blank period.

Advantageous Effect

In the present embodiment, even when a frame frequency varies based on an input image in a process of compensating for an electrical characteristic deviation between pixels on the basis of the external compensation method, a user may not recognize a position of a compensation pixel.

The effects according to the present embodiment are not limited to the above examples, and other various effects may be included in the specification.

MODE FOR INVENTION

Figure 1:
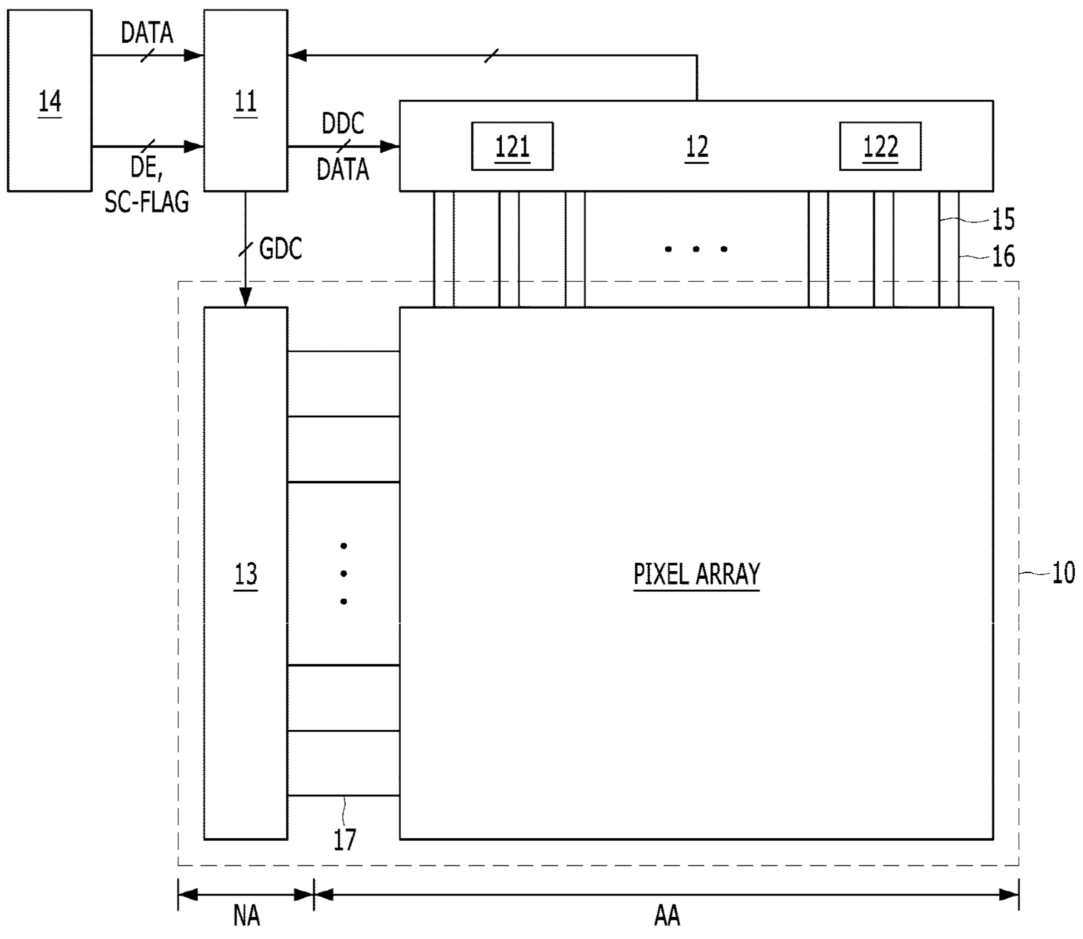
FIG. 1 is a diagram illustrating an electroluminescence display device according to an embodiment of the specification.

Advantages and features of the specification, and implementation methods thereof will be clarified through following embodiments described with reference to the accompanying drawings. The specification may, however, be embodied in different forms and should not be construed as limited to the embodiments set forth herein. Rather, these embodiments are provided so that this disclosure will be thorough and complete, and will fully convey the scope of the specification to those skilled in the art.

The shapes, sizes, ratios, angles, numbers and the like disclosed in the drawings for description of various embodiments of the specification to describe embodiments of the specification are merely exemplary and the specification is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the specification are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the specification.

Like reference numerals refer to like elements throughout.

In the specification, a gate driving circuit provided on a substrate of a display panel may be implemented with a thin film transistor (TFT) having an n-type metal oxide semiconductor field effect transistor (MOSFET) structure, but is not limited thereto and may be implemented with a TFT having a p-type MOSFET structure. A TFT may be a three-electrode element which includes a gate, a source, and a drain. The source may be an electrode which supplies a carrier to a transistor. In the TFT, a carrier may start to flow from the source. The drain may be an electrode which enables the carrier to flow out from the TFT. That is, in a MOSFET, the carrier flows from the source to the drain. In the n-type TFT (NMOS), because a carrier is an electron, a source voltage may have a lower voltage than a drain voltage so that the electron flows from the source to the drain. In the n-type TFT, because the electron flows from the source to the drain, a current may flow from the drain to the source. On the other hand, in the p-type TFT (PMOS), because a carrier is a hole, a source voltage may be higher than a drain voltage so that the hole flows from the source to the drain. In the p-type TFT, because the hole flows from the source to the drain, a current may flow from the source to the drain. It should be noted that a source and a drain of a MOSFET are not fixed but switch therebetween. For example, the source and the drain of the MOSFET may switch therebetween. Therefore, in describing embodiments of the specification, one of a source and a drain will be described as a first electrode, and the other of the source and the drain will be described as a second electrode.

In the following description, when the detailed description of the relevant known function or configuration is determined to unnecessarily obscure the important point of the specification, the detailed description will be omitted.

Hereinafter, embodiments of the specification will be described in detail with reference to the accompanying drawings.

Figure 2:
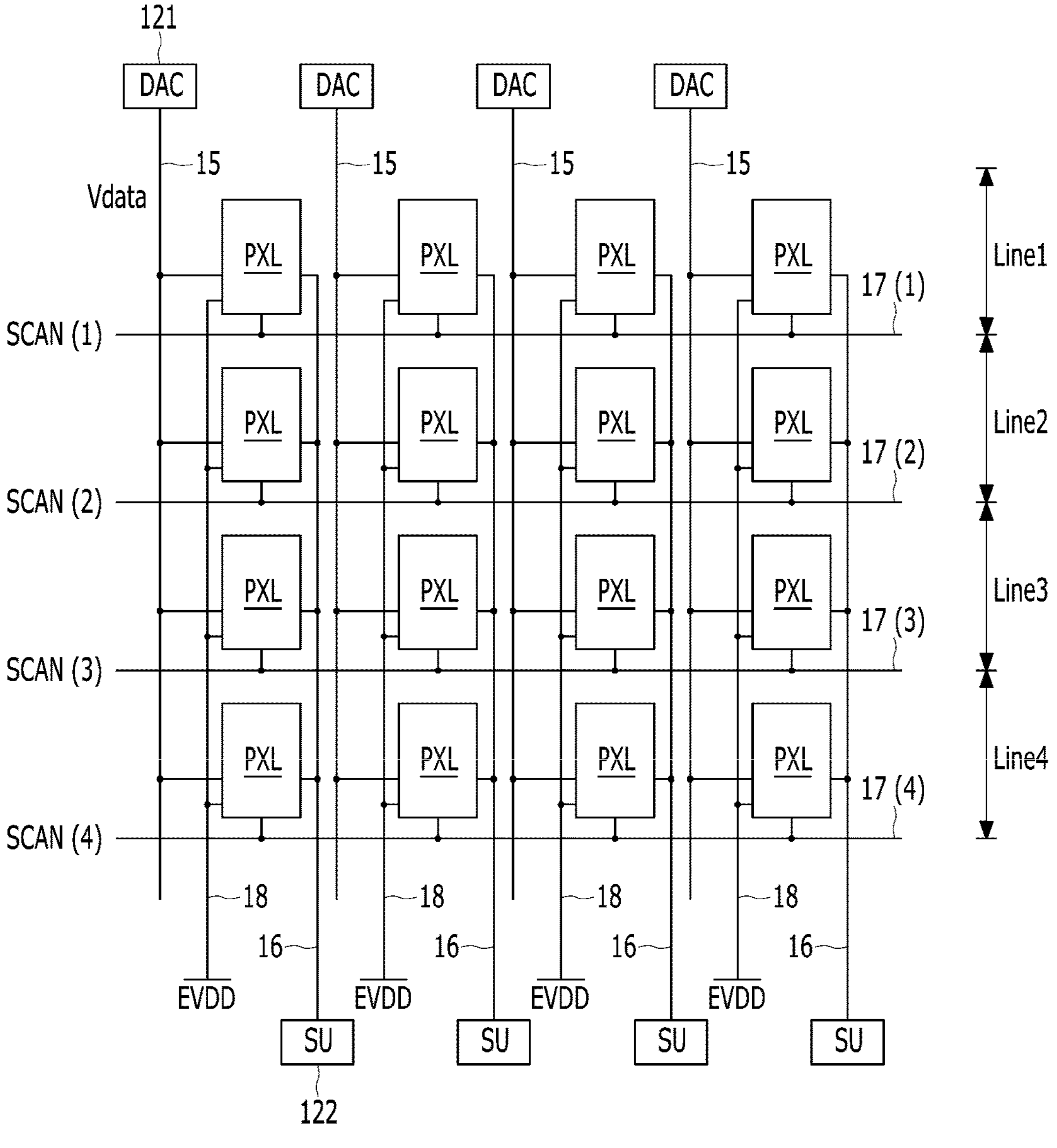
FIG. 2 is a diagram illustrating a pixel array included in the electroluminescence display device of FIG. 1.
Figure 3:
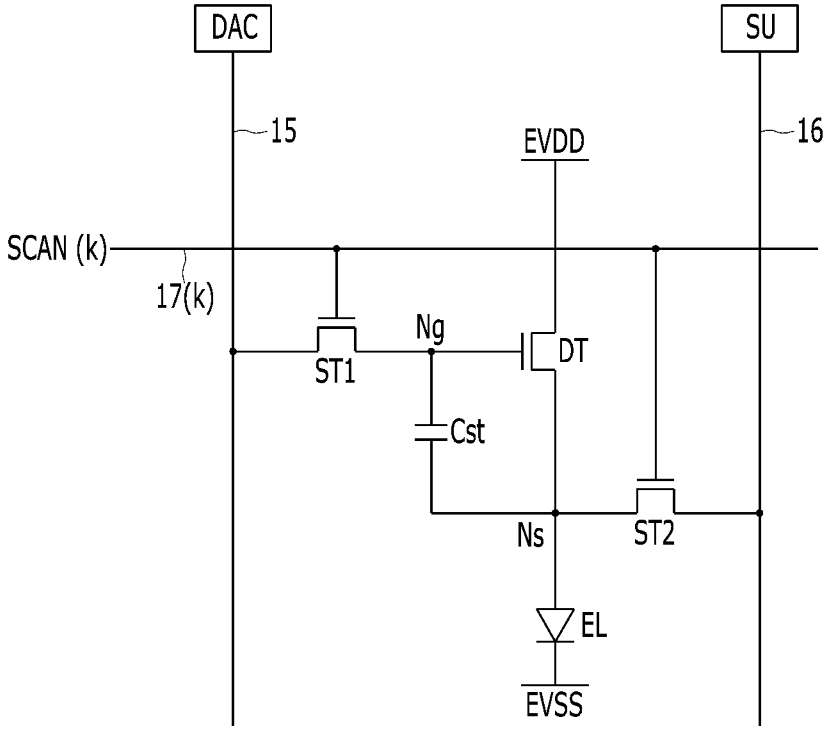
FIG. 3 is an equivalent circuit diagram of a pixel included in the pixel array of FIG. 2.
Figure 4:
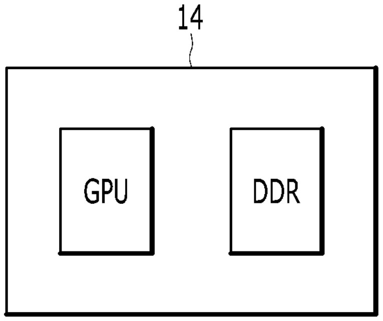
FIG. 4 is a diagram illustrating a configuration of a host system for varying a frame frequency.
Figure 5:
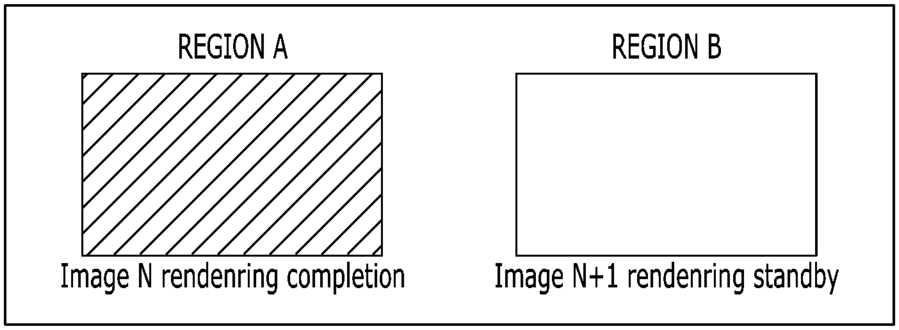
FIG. 5 is a diagram for describing a memory control operation at a processing end time of an $N^{th}$ frame image.
Figure 6:
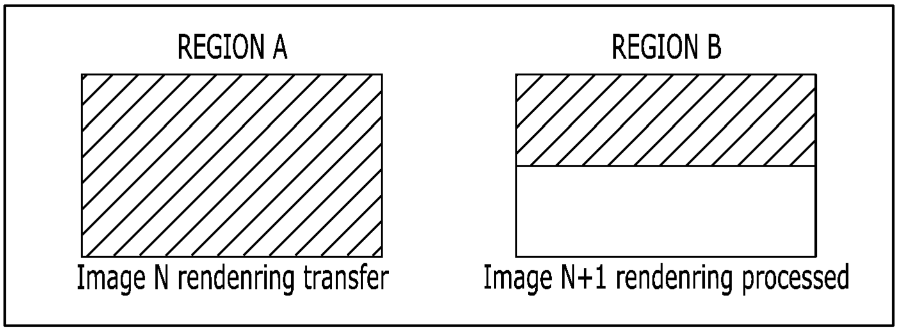
FIG. 6 is a diagram for describing a memory control operation at a processing performing time of an $N+1^{th}$ frame image.

FIG. 1 is a diagram illustrating an electroluminescence display device according to an embodiment of the specification. FIG. 2 is a diagram illustrating a pixel array included in the electroluminescence display device of FIG. 1. FIG. 3 is an equivalent circuit diagram of a pixel included in the pixel array of FIG. 2. FIG. 4 is a diagram illustrating a configuration of a host system for varying a frame frequency. FIG. 5 is a diagram for describing a memory control operation at a processing end time of an $N^{th}$ frame image. Also, FIG. 6 is a diagram for describing a memory control operation at a processing performing time of an $N+1^{th}$ frame image.

Referring to FIGS. 1 to 3, the electroluminescence display device according to an embodiment of the specification may include a display panel 10, a timing controller 11, a plurality of panel driving circuits 121 and 13, and a sensing circuit 122. The panel driving circuits 121 and 13 may include a digital-to-analog converter (DAC) 121, connected to a plurality of data lines 15 of the display panel 10, and a gate driver 13 connected to a plurality of gate lines 17 of the display panel 10. The panel driving circuits 121 and 13 and the sensing circuit 122 may be equipped in a data integrated circuit (IC) 12.

The display panel 10 may include the plurality of data lines 15, a plurality of readout lines 16, and the plurality of gate lines 17. Also, a plurality of pixels PXL may be respectively provided in a plurality of pixel areas defined by intersections of the date lines 15, the readout lines 16, and the gate lines 17. Based on the pixels PXL arranged as a matrix type, a pixel array illustrated in FIG. 2 may be provided in a display area AA of the display panel 10.

In the pixel array, the pixels PXL may be grouped into pixel group lines with respect to one direction. Each of the pixel group lines (Line1 to Line4) may include a plurality of pixels PXL adjacent to one another in an extension direction (or a horizontal direction) of the gate line 17. The pixel group line may denote a set of pixels PXL which are arranged adjacent to one another in one horizontal direction thereof, instead of a physical signal line. Therefore, pixels PXL configuring the same pixel group line may be connected to the same gate line 17. Pixels PXL configuring the same pixel group line may be connected to different data lines 15, but are not limited thereto. Pixels PXL configuring the same pixel group line may be connected to different readout lines 16, but are not limited thereto and a plurality of pixel PXL for realizing different colors may share one readout line 16.

In the pixel array, each of the pixels PXL may be connected to the DAC 121 through the data line 15 and may be connected to the sensing circuit 122 through the readout line 16. The DAC 121 and the sensing circuit 122 may be embedded into the data integrated circuit 12, but are not limited thereto. The sensing circuit 122 may be mounted on a control printed circuit board (PCB) (not shown) outside the data integrated circuit 12.

In the pixel array, each of the pixels PXL may be connected to a high level pixel power EVDD through a high level power line 18. Also, each of the pixels PXL may be connected to the gate driver 13 through gate lines 17(1) to 17(4).

In the pixel array, the pixels PXL may include a plurality of pixels for implementing a first color, a plurality of pixels for implementing a second color, and a plurality of pixels for implementing a third color, and moreover, may further include a plurality of pixels for implementing a fourth color. The first to fourth colors may each be one color selected from among red, green, blue, and white.

Each pixel PXL may be implemented as in FIG. 3, but is not limited thereto. One pixel PXL provided in a kth (where k is an integer) pixel group line may include a light emitting device EL, a driving thin film transistor (TFT) DT, a storage capacitor Cst, a first switch TFT ST1, and a second switch TFT ST2. The first switch TFT ST1 and the second switch TFT ST2 may be connected to the same gate line 17(*k*).

The light emitting device EL may emit light on the basis of a pixel current. The light emitting device EL may include an anode electrode connected to a source node Ns, a cathode electrode connected to a low level pixel power EVSS, and an organic or inorganic compound layer disposed between the anode electrode and the cathode electrode. The organic or inorganic compound layer may include a hole injection layer (HIL), a hole transport layer (HTL), an emission layer (EML), an electron transport layer (ETL), and an electron injection layer (EIL). When a voltage applied to the anode electrode is higher than an operating point voltage compared to the low level pixel power EVSS applied to the cathode electrode, the light emitting device EL may be turned on. When the light emitting device EL is turned on, a hole passing through the hole transport layer (HIL) and an electron passing through the electron transport layer (ETL) may move to the emission layer (EML) to generate an exciton, and thus, the emission layer (EML) may emit light.

The driving TFT DT may be a driving element. The driving TFT DT may generate the pixel current flowing in the light emitting device EL, on the basis of a voltage difference between a gate node Ng and a source node Ns thereof. The driving TFT DT may include a gate electrode connected to the gate node Ng, a first electrode connected to the high level pixel power EVDD, and a second electrode connected to the source node Ns. The storage capacitor Cst may be connected between the gate node Ng and the source node Ns and may store a gate-source voltage of the driving TFT DT.

The first switch TFT ST1 may allow a current to flow between the data line 15 and the gate node Ng on the basis of a gate signal SCAN(k) and may apply a data voltage, charged into the data line 15, to the gate node Ng. The first switch TFT ST1 may include a gate electrode connected to the gate line 17(*k*), a first electrode connected to the data line 15, and a second electrode connected to the gate node Ng. The second switch TFT ST2 may allow a current to flow between the readout line 16 and the source node Ns on the basis of the gate signal SCAN(k) and may transfer a voltage of the source node Ns, based on the pixel current, to the readout line 16. The second switch TFT ST2 may include a gate electrode connected to the gate line 17(*k*), a first electrode connected to the source node Ns, and a second electrode connected to the readout line 16.

Such a pixel structure is merely an embodiment, and the technical spirit of the specification is not limited to the pixel structure. It should be noted that the technical spirit of the specification may be applied to various pixel structures for sensing an electrical characteristic (for example, a threshold voltage or electron mobility) of the driving TFT DT.

The host system 14 may be connected to the timing controller 11 through various interface circuits and may transfer various signals DATA, DE, and SC-FLAG, needed for driving a panel, to the timing controller 11. The host system 14, as in FIG. 4, may include a graphics processor unit GPU and a memory DDR and may process an input image source according to a purpose on the basis of a predetermined application to transfer the processed image source to the timing controller 11. The image source may be input in a streaming form, and thus, the image source needs to be temporarily stored in the memory DDR, for data processing. The image source is generally processed by one-frame units, and this is for decreasing complexity and the cost expended in data processing.

The graphics processor unit GPU performs a rendering operation by using a method of processes image data by one-frame units on the basis of various image processing commands and stores image-processed frame data in the memory DDR by using a draw command. The memory DDR, as in FIGS. 5 and 6, is divided into two regions A and B so that a rendering operation and a transfer operation are simultaneously performed in different regions. While a rendering operation on $N^{th}$ frame image data is being performed in the region A, $N-1^{th}$ frame image data may be transferred from the region B in synchronization with a data enable signal DE. When the rendering operation on the $N^{th}$ frame image data is completed, the graphics processor unit GPU synchronizes the $N^{th}$ frame image data with the data enable signal DE and transfers the $N^{th}$ frame image data from the region A to the timing controller 11. At this time, the graphics processor unit GPU performs image processing on the $N+1^{th}$ frame image data and performs a rendering operation on the $N+1^{th}$ frame image data in the region B.

The complexity of an input image may be changed in real time. A time taken in rendering processing increases more in a complicated image than a simple image. For this reason, a time taken in transferring data in a first region of the memory DDR may not match a time taken in rendering data in a second region. For example, when the $N+1^{th}$ frame image data is more complicated than the $N^{th}$ frame image data, the graphics processor unit GPU may still perform a rendering operation on the $N+1^{th}$ frame image data in the region B at a time at which the transfer of the $N^{th}$ frame image data in the region A is completed. At this time, the graphics processor unit GPU extends the vertical blank period until the rendering operation on the $N+1^{th}$ frame image data is completed, and thus, prevents the $N+1^{th}$ frame image data from being transferred in a state which is unstably rendered. During the vertical blank period, because the data enable signal DE is transferred in only a logic low state without transition, it is impossible to transfer image data.

As described above, the graphics processor unit GPU may vary a length of the vertical blank period on the basis of the complexity of an image, thereby securing a data rendering time. A frame frequency varies when the length of the vertical blank period varies in one frame, and this is referred to as variable refresh rate (VRR) technology. The VRR technology is for varying a frame frequency on the basis of an input image to prevent a tearing phenomenon of an image and to provide a smoother image screen. In a variable frame frequency environment, the length of the vertical blank period varies based on a frame frequency, but a length of the vertical active period is fixed. The vertical blank period may be set to be shortest in a fastest frame frequency within a predetermined variable frame frequency range and to increase as a frame frequency is slowed.

When a data rendering operation is completed in the first region or the second region, the graphics processor unit GPU transfers a rendering completion signal SC-FLAG in the vertical blank period before transferring rendering-completed image data. After a certain time elapses from after the graphics processor unit GPU transfers the rendering completion signal SC-FLAG, the graphics processor unit GPU synchronizes the data enable signal DE having a transition state with the rendering-completed image data of the subsequent frame and transfers the rendering-completed image data and the data enable signal DE to the timing controller 11. The certain time has a fixed length regardless of a variation of a frame frequency.

The host system 14 may be implemented with an application processor, a personal computer, a set-top box, or the like, but is not limited thereto. The host system 14 may be mounted on a system board, but is not limited thereto. The host system 14 may further include an input unit which receives a user command/data and a main power unit which generates a main power.

The timing controller 11 receives the data enable signal DE, input image data IDATA, and the rendering completion signal SC-FLAG, which are synchronized with the variable frame frequency, from the host system 14.

The timing controller 11 sets a sensing period on the basis of the rendering completion signal SC-FLAG in the vertical blank period. The timing controller 11 may implement sensing driving on the basis of the rendering completion signal SC-FLAG, and thus, may prevent a length of a luminance recovery period corresponding to the same pixel group line from being changed by a variation of a frame frequency and may increase sensing reliability. The timing controller 11 may fix the length of the luminance recovery period corresponding to the same pixel group line regardless of the variation of the frame frequency, and thus, may solve a problem where a position of a compensation pixel is recognized by a user due to a luminance deviation between a compensation pixel and a non-compensation pixel when the frame frequency varies rapidly. This will be described in detail with reference to FIGS. 15 to 19.

The timing controller 11 may control operation timings of the panel driving circuits 121 and 13 and the sensing circuit 122 so that display driving, sensing driving, and luminance recovery driving are temporally divided.

The display driving is an operation of applying a first data voltage (hereinafter referred to as a display data voltage) for display driving to pixel group lines in a vertical active period of one frame to reproduce an input image in the display panel 10. The sensing driving is an operation of applying a second data voltage (hereinafter referred to as a sensing data voltage) to pixels PXL disposed in a specific pixel group line (hereinafter referred to as a sensing pixel group line) in a vertical blank period of one frame to sense and compensate for an electrical characteristic of corresponding pixels PXL. Also, the luminance recovery driving is an operation of applying a third data voltage (hereinafter referred to as a luminance recovery data voltage), to which a luminance compensation gain is applied, to the pixels PXL of the sensing pixel group line on which the sensing operation has been completed, thereby compensating for luminance loss caused by the sensing operation. Because the third data voltage is a voltage where the luminance compensation gain is applied to the first data voltage, the third data voltage may differ from the first data voltage. The luminance recovery driving is performed until a second data voltage of a subsequent frame is applied to the pixels PXL disposed in the sensing pixel group line.

In the display driving, the timing controller 11 may generate a first data control signal DDC for controlling an operation timing of the data integrated circuit 12 and a first gate control signal GDC for controlling an operation timing of the gate driver 13, on the basis of timing signals such as the data enable signal DE. In the sensing driving, the timing controller 11 may generate a second data control signal DDC for controlling the operation timing of the data integrated circuit 12 and a second gate control signal GDC for controlling the operation timing of the gate driver 13, on the basis of the timing signals such as the data enable signal DE. Also, in the luminance recovery driving, the timing controller 11 may generate a third data control signal DDC for controlling the operation timing of the data integrated circuit 12 and a third gate control signal GDC for controlling the operation timing of the gate driver 13, on the basis of the timing signals such as the data enable signal DE.

The timing controller 11 may individually control a display driving timing, a sensing driving timing, and a luminance recovery driving timing of each of the pixel group lines of the display panel 10 on the basis of the gate control signals GDC and the data control signals DDC, and thus, an electrical characteristic of each of the pixels PXL may be sensed and compensated for by pixel group line units in real time in the middle of displaying an image.

The timing controller 11 may control an operation of each of the panel driving circuits 121 and 13 so that the display driving is performed in the vertical active period of one frame and may control an operation of each of the sensing circuit 122 and the panel driving circuits 121 and 13 so that the sensing driving is performed in the vertical blank period prior to the vertical active period of the one frame. Also, the timing controller 11 may control operations of the panel driving circuits 121 and 13 so that the luminance recovery driving is performed between an end time of the sensing driving and a start time of the display driving, with respect to a sensing pixel group line.

The vertical active period is a period which corresponds to a transition period of the data enable signal DE and where a display data voltage is applied to pixels PXL disposed in all pixel group lines. The vertical blank period is a period which corresponds to a non-transition period of the data enable signal DE and where the application of the display data voltage stops, and the vertical blank period may include the sensing period and may partially include the luminance recovery period. In the sensing period, a sensing data voltage may be applied to pixels PXL disposed in a sensing pixel group line, and in the luminance recovery period succeeding the sensing period, a luminance recovery data voltage may be applied to the pixels PXL disposed in the sensing pixel group line.

The gate driver 13 may separately generate a display scan signal SCAN, a sensing scan signal, and a luminance recovery scan signal on the basis of control by the timing controller 11.

In order to implement the display driving, in the vertical active period, the gate driver 13 may generate the display scan signal on the basis of the first gate control signal GDC and may sequentially supply the display scan signal to the gate lines 17 connected to pixel group lines, in the vertical active period.

In order to implement the sensing driving, in the vertical blank period, the gate driver 13 may generate the sensing scan signal on the basis of the second gate control signal GDC and may supply the sensing scan signal to the gate line 17 connected to the sensing pixel group line. Subsequently, in order to implement the luminance recovery driving, the gate driver 13 may generate the luminance recovery scan signal on the basis of the third gate control signal GDC and may further supply the luminance recovery scan signal to the gate line 17 connected to the sensing pixel group line.

In a case where one pixel group line is sensing-driven at every vertical blank period, positions of sensing pixel group lines may be randomly distributed based on an operation in a plurality of vertical blank periods. When the positions of the sensing pixel group lines are randomly distributed, an adverse effect where the positions of the sensing pixel group lines are recognized may be minimized by a visual integral effect.

The gate driver 13 may be provided in a non-display area NA of the display panel 10 on the basis of a gate driver in panel (GIP) type.

The DAC 121 may be connected to the data lines 15. The DAC 121 may separately generate a display data voltage Vdata, a sensing data voltage, and a luminance recovery data voltage on the basis of control by the timing controller 11.

In order to implement the display driving, in the vertical active period, the DAC 121 may convert the rendered image data DATA into a display data voltage on the basis of the first data control signal DDC and may supply the display data voltage to the data lines 15 in synchronization with the display scan signal SCAN.

In order to implement the sensing driving, in the vertical blank period, the DAC 121 may generate a sensing data voltage having a certain level on the basis of the second data control signal DDC and may supply the sensing data voltage to the data lines 15 in synchronization with the sensing scan signal.

In order to implement the luminance recovery driving, the DAC 121 may convert image data DATA, in which the luminance compensation gain is reflected, into a luminance recovery data voltage on the basis of the third data control signal DDC and may further supply the luminance recovery data voltage to the data lines 15 in synchronization with the luminance recovery scan signal.

In the sensing driving, the sensing circuit 122 may be connected to target pixels PXL of a sensing pixel group line through the readout lines 16. In the sensing period included in the vertical blank period, the sensing circuit 122 may sense an electrical characteristic of a driving TFT DT, included in each of the target pixels PXL, through the readout lines 16. The sensing circuit 122 may be implemented as a voltage sensing type, or may be implemented as a current sensing type.

A voltage sensing type sensing circuit 122 may include a sampling circuit and an analog-to-digital converter (ADC). The sampling circuit may directly sample a specific node voltage of the target pixel PXL stored in a parasitic capacitor of the readout line 16. The ADC may convert an analog voltage, obtained through sampling by the sampling circuit, into a digital sensing value and may transfer the digital sensing value to the timing controller 11.

A current sensing type sensing circuit 122 may include a current integrator, a sampling circuit, and an ADC. The current integrator may perform an integral on the pixel current flowing in the target pixel PXL to output a sensing voltage. The sampling circuit may sample the sensing voltage output from the current integrator. The ADC may convert an analog voltage, obtained through sampling by the sampling circuit, into a digital sensing value and may transfer the digital sensing value to the timing controller 11.

Figure 7:
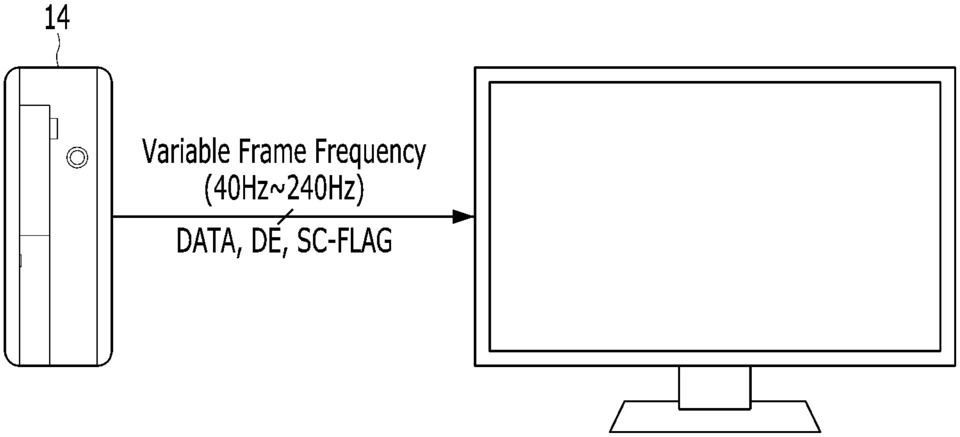
FIG. 7 is a diagram illustrating an example where signals based on a variable frame frequency are transferred and received between a host system and a timing controller.

FIG. 7 is a diagram illustrating an example where signals based on a variable frame frequency are transferred and received between a host system and a timing controller. Also, FIGS. 8 and 9 are diagrams for describing variable refresh rate (VRR) technology for varying a frame frequency on the basis of an input image.

Referring to FIG. 7, the host system 14 changes a length of a vertical blank period (i.e., a length of a non-transition period of a data enable signal) on the basis of a rendering time of an input image. Problems such as screen disconnection, screen shaking, and input delay caused by a rapid change in an image may be solved by a variation of a frame frequency. Based on a data rendering time of the input image, the host system 14 may adjust the frame frequency within a frequency range of 40 Hz to 240 Hz, or in a still image, the host system 14 may adjust the frame frequency within a frequency range of 1 Hz to 10 Hz, but is not limited thereto. A range of a variable frame frequency may be differently set based on a model and spec.

Figure 8:
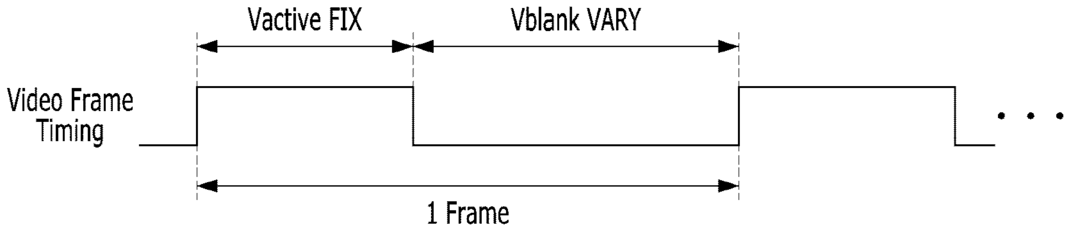
FIGS. 8 and 9 are diagrams for describing variable refresh rate (VRR) technology for varying a frame frequency on the basis of an input image.
Figure 9:
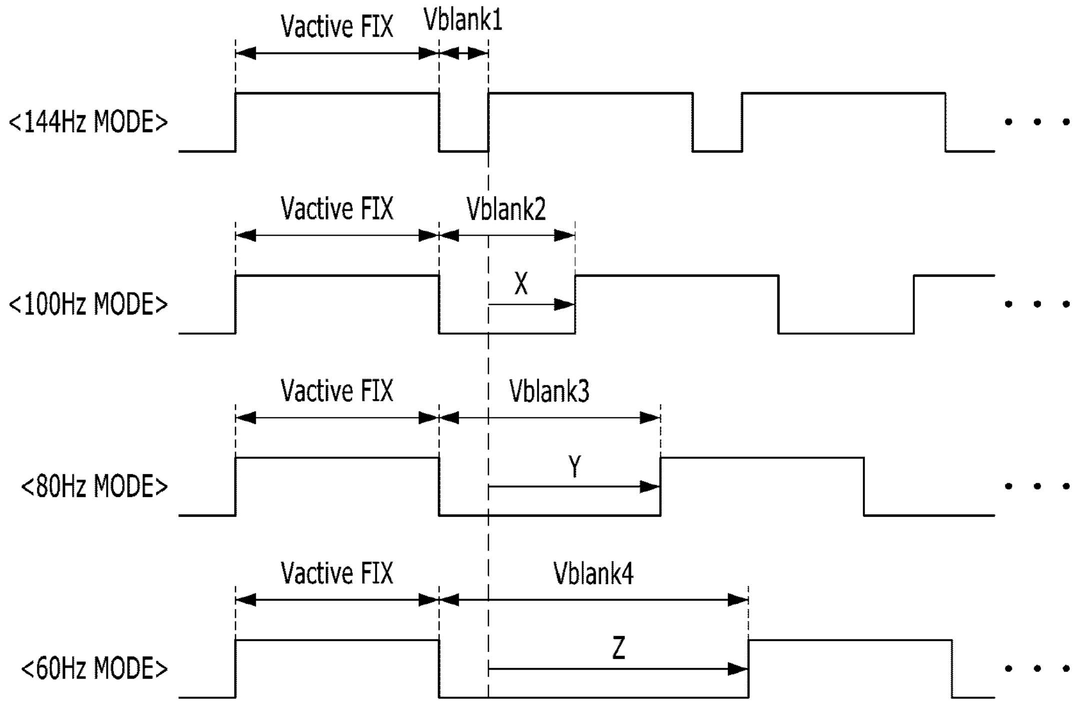

The host system 14 may fix a length of a vertical active period Vactive as in FIG. 8 and may adjust a length of a vertical blank period Vblank on the basis of the data rendering time of the input image, thereby varying the frame frequency. For example, as in FIG. 9, the host system 14 may include a first vertical blank period Vblank1 so as to implement a 144 Hz mode. The host system 14 may include a second vertical blank period Vblank2 increased by an "X" period from the first vertical blank period Vblank1, so as to implement the 100 Hz mode. The host system 14 may include a third vertical blank period Vblank3 increased by a "Y" period from the first vertical blank period Vblank1, so as to implement an 80 Hz mode. The host system 14 may include a fourth vertical blank period Vblank4 increased by a "Z" period from the first vertical blank period Vblank1, so as to implement a 60 Hz mode.

FIGS. 10 to 12B are diagrams for describing sensing pixel group line compensation (SLC) technology for compensating for a length deviation of a luminance recovery period with respect to a position of a sensing pixel group line, in external compensation technology.

A case will be described where, when a frame frequency environment is a fixed frame frequency environment of X Hz as in FIG. 10, pixels of an m−1$^{th}$ pixel group line (i.e., pixels of a pixel group line supplied with SCAN(m−1)) are sensed in a vertical blank period Vblank of an N−1$^{th}$ frame, and pixels of a fourth pixel group line (i.e., pixels of a pixel group line supplied with SCAN(4)) are sensed in a vertical blank period Vblank of an N$^{th}$ frame (X Hz).

In a first display period DTME1, the pixels of the m−1$^{th}$ pixel group line may be charged with a display data voltage (WT-DIS operation) on the basis of an m−1$^{th}$ display scan signal SCAN(m−1), and then, may maintain an emission state based on the display data voltage (HLD-DIS operation) for the other time of the first display period DTME1. The first display period DTME1 may partially overlap a vertical active period Vactive and a vertical blank period Vblank of the N−1$^{th}$ frame.

In a sensing period STME succeeding the first display period DTME1, the pixels of the m−1$^{th}$ pixel group line may be charged with a sensing data voltage (WT-SEN operation) on the basis of a sensing scan signal, and then, may be to be sensed in a non-emission state. The sensing period STME may be in the vertical blank period Vblank of the N−1$^{th}$ frame.

In a first luminance recovery period RTME1 succeeding the sensing period STME, the pixels of the m−1$^{th}$ pixel group line may be charged with a luminance recovery data voltage (WT-RCV operation) on the basis of a luminance recovery scan signal, and then, may maintain an emission state based on the luminance recovery data voltage (HLD-RCV operation) for the other time of the first luminance recovery period RTME1. The first luminance recovery period RTME1 may partially overlap the vertical blank period Vblank of the N−1$^{th}$ frame and a vertical active period Vactive of the N$^{th}$ frame.

In a second display period DTME2, the pixels of the fourth pixel group line may be charged with a display data voltage (WT-DIS operation) on the basis of a fourth display scan signal SCAN(4), and then, may maintain an emission state based on the display data voltage (HLD-DIS operation) for the other time of the second display period DTME2. The second display period DTME2 may partially overlap the vertical active period Vactive and the vertical blank period Vblank of the $N^{th}$ frame.

In a sensing period STME succeeding the second display period DTME2, the pixels of the fourth pixel group line may be charged with the sensing data voltage (WT-SEN operation) on the basis of the sensing scan signal, and then, may be to be sensed in a non-emission state. The sensing period STME may be in the vertical blank period Vblank of the $N^{th}$ frame.

In a second luminance recovery period RTME2 succeeding the sensing period STME, the pixels of the fourth pixel group line may be charged with the luminance recovery data voltage (WT-RCV operation) on the basis of the luminance recovery scan signal, and then, may maintain an emission state based on the luminance recovery data voltage (HLD-RCV operation) for the other time of the second luminance recovery period RTME2. The second luminance recovery period RTME2 may partially overlap the vertical blank period Vblank of the $N^{th}$ frame and a vertical active period Vactive of an $N+1^{th}$ frame.

Because a frame frequency environment is the fixed frame frequency environment, a length of the vertical blank period Vblank of the $N-1^{th}$ frame may be the same as that of the vertical blank period Vblank of the $N^{th}$ frame. Also, in each of the vertical blank period Vblank of the $N-1^{th}$ frame and the vertical blank period Vblank of the $N^{th}$ frame, the sensing period STME may have the same time length. Also, because the frame frequency environment is the fixed frame frequency environment, a length of one frame needed for a display driving operation, a sensing driving operation, and a luminance recovery driving operation performed on the pixels of the $m-1^{th}$ pixel group line may be the same as that of one frame needed for a display driving operation, a sensing driving operation, and a luminance recovery driving operation performed on the pixels of the fourth pixel group line.

In the vertical active period Vactive of the $N-1^{th}$ frame, the $m-1^{th}$ display scan signal SCAN(m−1) may have a phase which is later than that of the fourth display scan signal SCAN(4). Therefore, with respect to the pixels of the $m-1^{th}$ pixel group line, the first display period DTME1 may be relatively short, and the first luminance recovery period RTME1 may be relatively long.

In the vertical active period Vactive of the $N^{th}$ frame, the fourth display scan signal SCAN(4) may have a phase which is later than that of the $m-1^{th}$ display scan signal SCAN(m−1). Therefore, with respect to the pixels of the fourth pixel group line, the second display period DTME2 may be relatively long, and the second luminance recovery period RTME2 may be relatively short.

Figure 10:
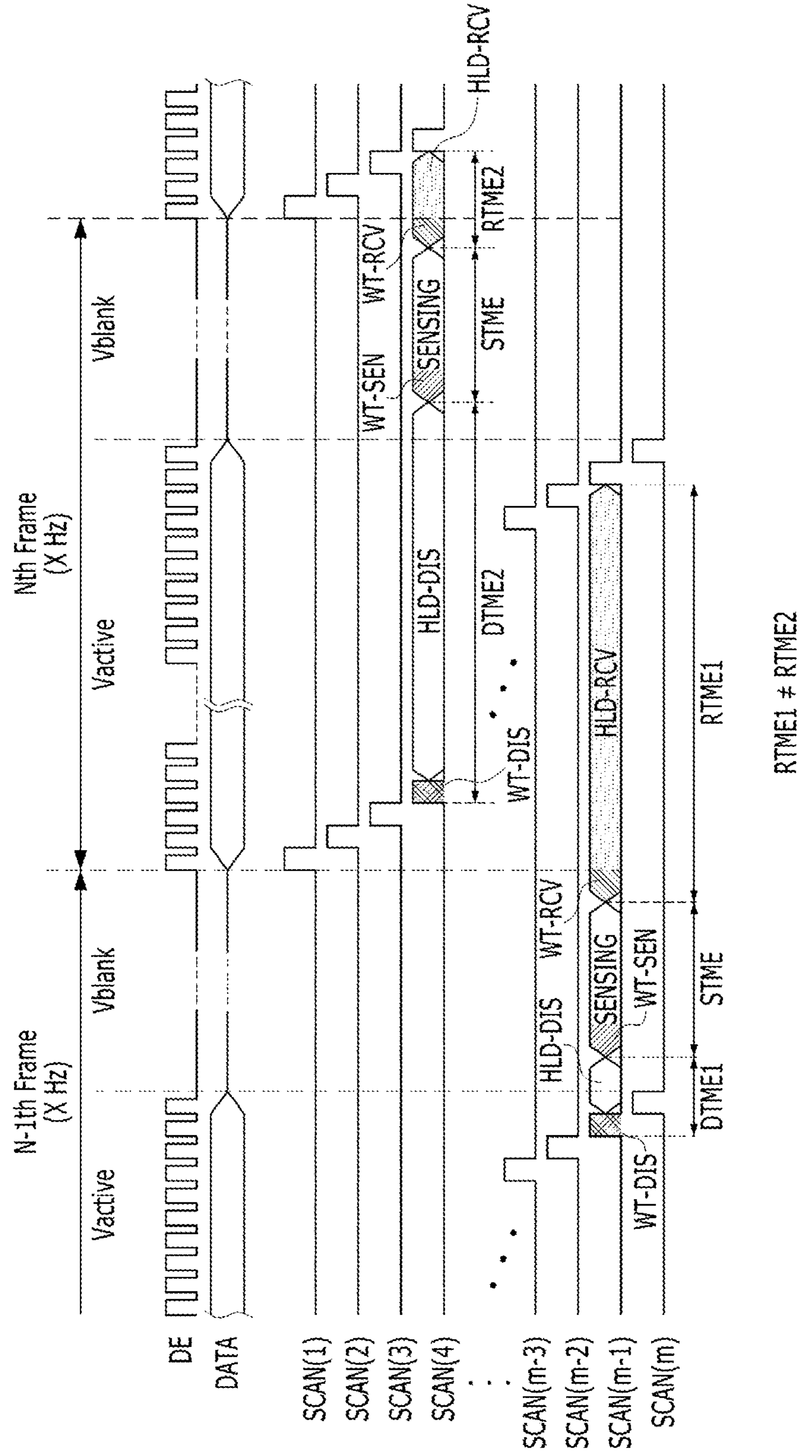
FIGS. 10 and 11 are diagrams for describing an example where a length of a luminance recovery period varies based on a position of a pixel group line including a sensing pixel in external compensation technology.
Figure 11:
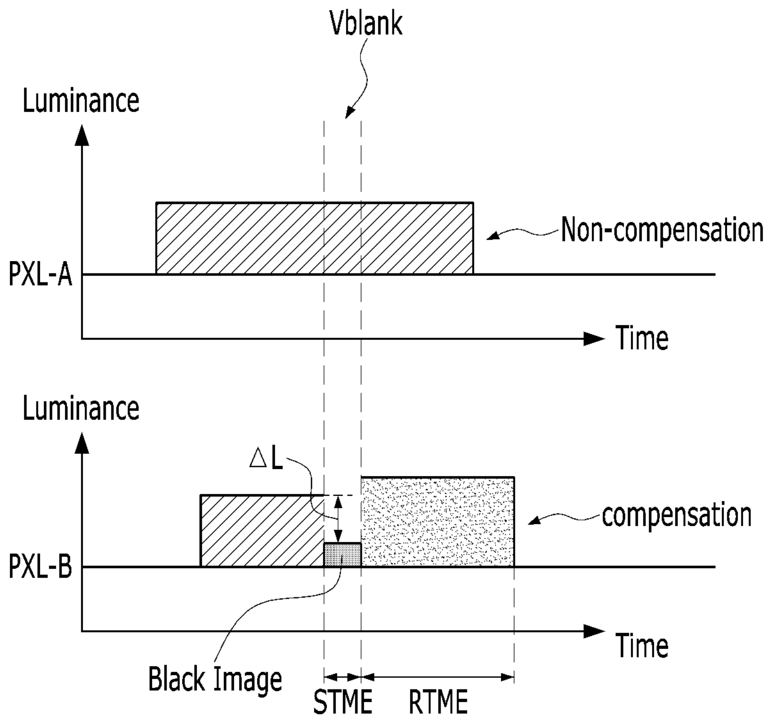

However, as in FIG. 11, in a case where all pixels in one screen display an image having the same brightness, pixels of a sensing pixel group line PXL-B may not emit light during a sensing period STME in a vertical blank period Vblank, and thus, may realize luminance which is "ΔL" lower than pixels of a non-sensing pixel group line PXL-A. The sensing pixel group line PXL-B may be the $m-1^{th}$ and fourth pixel group lines in the embodiment of FIG. 10.

In the embodiment of FIG. 10, the first luminance recovery period RTME1 and the second luminance recovery period RTME2 may be for compensating for luminance loss. The first luminance recovery period RTME1 and the second luminance recovery period RTME2 may have different time lengths, and thus, a luminance compensation gain may be differentially applied thereto. When the luminance compensation gain is applied, luminance in a luminance recovery period may be relatively higher than that in a display period as in FIG. 11, and thus, all pixels in one screen may substantially realize the same luminance.

A magnitude of the luminance compensation gain and a time length of the luminance recovery period may have an inversely proportional relationship therebetween. All sensing pixel group lines may have a sensing period having the same length regardless of relative positions of the sensing pixel group lines, and thus, may have the same luminance loss. However, the sensing pixel group lines may have luminance recovery periods having different lengths on the basis of relative positions therebetween, and thus, the magnitude of the luminance compensation gain for compensating for luminance loss may be differently applied to the sensing pixel group lines.

Figure 12A:
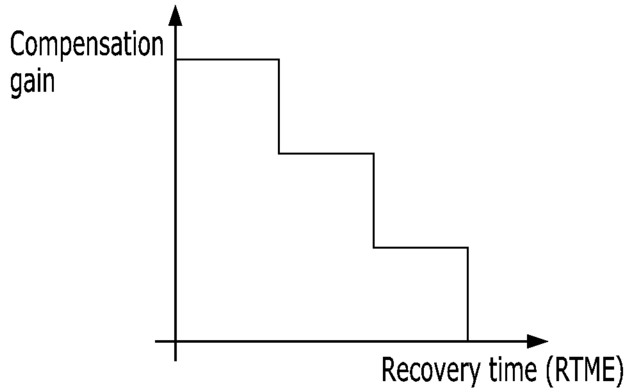
FIGS. 12A and 12B are diagrams illustrating examples where a luminance compensation gain for compensating for luminance loss based on sensing is differently set based on a length of a luminance recovery period.

The magnitude of the luminance compensation gain, as in FIG. 12A, may be differentially set for each of luminance recovery period blocks grouped based on a certain time size. Therefore, a luminance compensation gain logic may be simplified, and a compensation processing speed may increase.

Figure 12B:
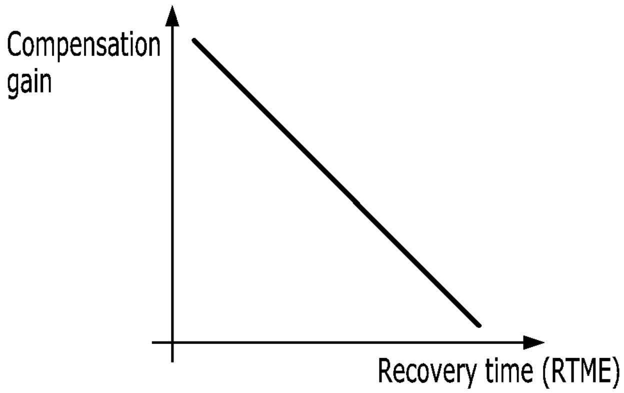

The magnitude of the luminance compensation gain, as in FIG. 12B, may be differentially set for each luminance recovery period which varies for each sensing pixel group line. Therefore, the accuracy of compensation may increase.

A correction operation performed on image data on the basis of the luminance compensation gain may be performed by the timing controller. The timing controller may further include an SLC compensation logic circuit for applying the luminance compensation gain to image data which is to be applied to a pixel of a sensing pixel group line.

The SLC technology, described above with reference to FIGS. 10 to 12B, may be implemented with a simple logic in a fixed frame frequency environment. A position of a sensing pixel group line may be predetermined for each frame, but because a frame frequency environment is a fixed frame frequency environment, a length of a luminance recovery period corresponding to the same sensing pixel group line may not be changed despite a frame being changed. That is, because the frame frequency environment is the fixed frame frequency environment, luminance recovery periods may be previously mapped to positions of sensing pixel group lines to have different fixed lengths. Also, the luminance compensation gain may be previously and differentially set for luminance recovery periods having different fixed lengths.

Figure 13:
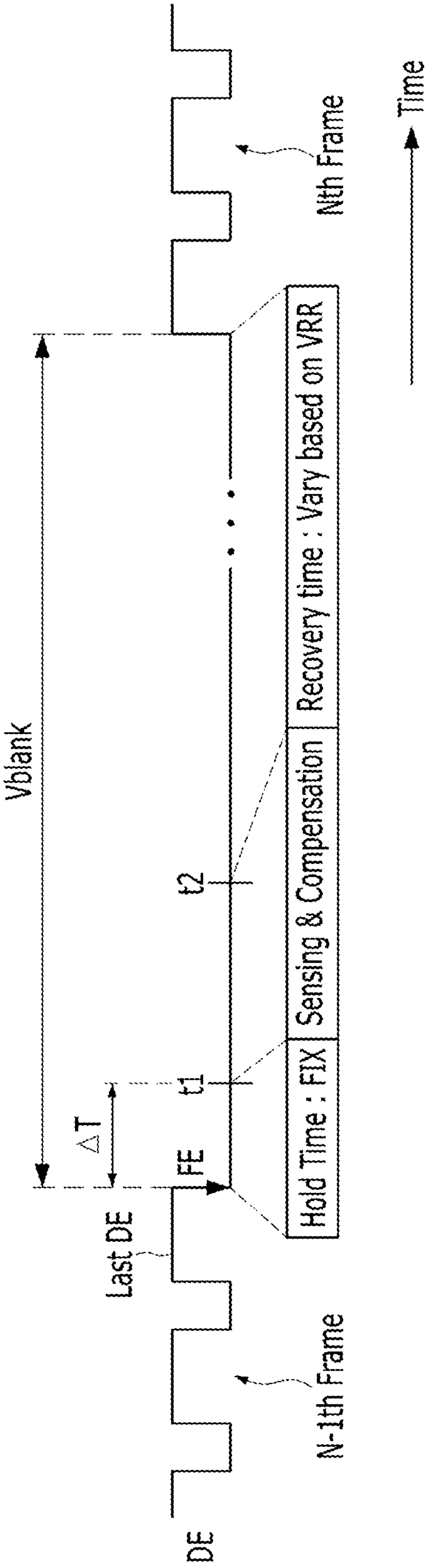
FIG. 13 is a diagram illustrating an example where a sensing period is set with reference to a last data enable signal of a vertical active period in a vertical blank period, in a comparative example of the specification.

FIG. 13 is a diagram illustrating an example where a sensing period is set with reference to a last data enable signal of a vertical active period in a vertical blank period, in a comparative example of the specification. Also, FIG. 14 is a diagram illustrating an example where a length of a luminance recovery period corresponding to the same pixel group line varies based on a variation of a frame frequency, when a sensing period is set as in FIG. 13.

Referring to FIG. 13, a timing controller may set a sensing period with respect to a falling edge FE of a last data enable signal (Last DE) of a vertical active period in a vertical blank period Vblank where a length thereof varies based on a rate of a frame frequency. For example, the timing controller may set a sensing period up to a t2 timing from a t1 timing delayed by ΔT with respect to the falling edge FE. At this time, a length of a luminance recovery period starting from the t2 timing varies based on the rate of the frame frequency.

In a case where a sensing period is set in a variable frame frequency environment as in FIG. 13, it is difficult to apply the above-described SLC technology. This is because a length of a luminance recovery period corresponding to the same sensing pixel group line varies based on a variation of a frame frequency.

Figure 14:
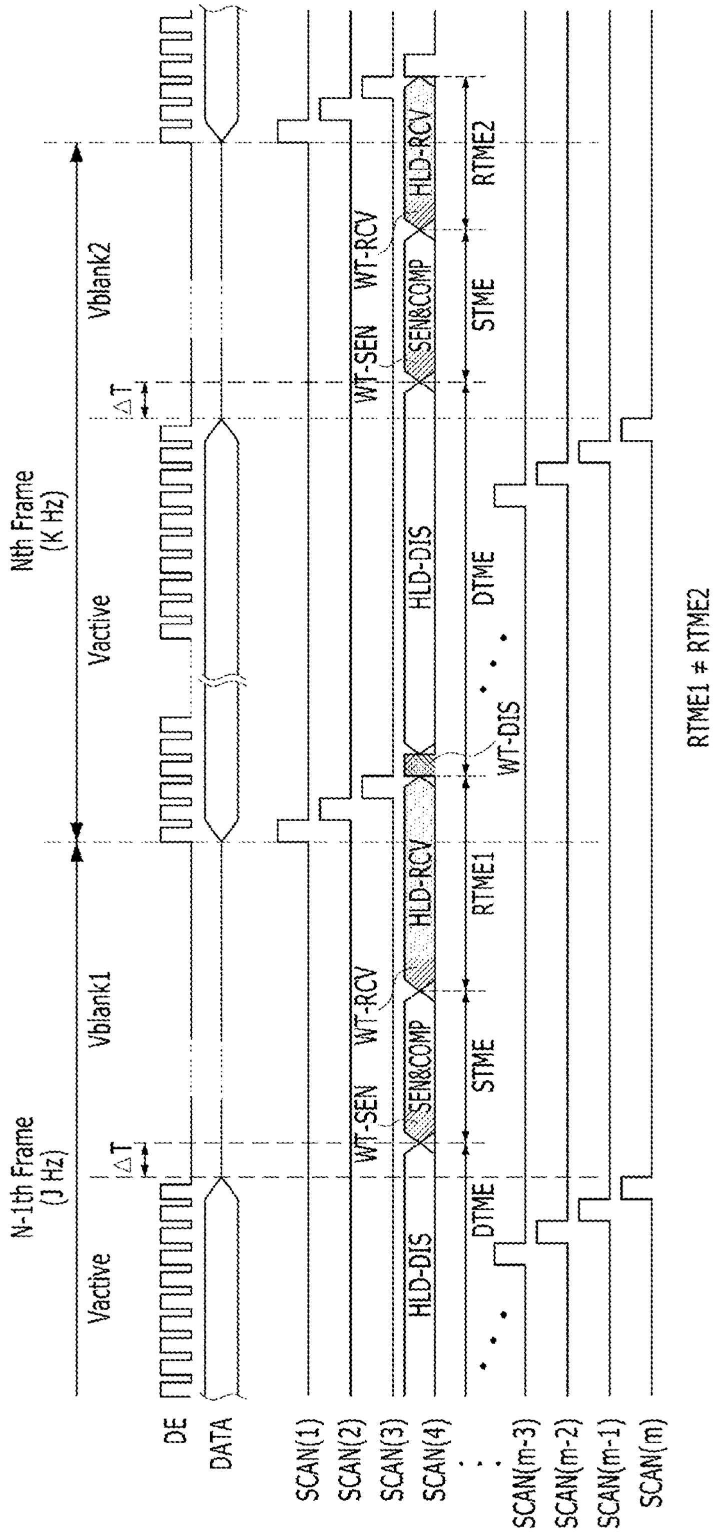
FIG. 14 is a diagram illustrating an example where a length of a luminance recovery period corresponding to the same pixel group line varies based on a variation of a frame frequency, when a sensing period is set as in FIG. 13.

For example, as in FIG. 14, it is assumed that pixels of a fourth pixel group line (i.e., pixels of a pixel group line supplied with SCAN(4)) are successively sensed in each of an N−1th frame having a frame frequency of J Hz and an $N^{th}$ frame having a frame frequency of K Hz which is higher than J Hz.

The vertical blank period Vblank is set to be longer in the $N-1^{th}$ frame having a relatively lower frame frequency than the $N^{th}$ frame. A length of a luminance recovery period in the $N-1^{th}$ and $N^{th}$ frames is determined by the vertical blank period Vblank. Accordingly, with respect to the same fourth pixel group line, a first luminance recovery period RTME1 of the $N-1^{th}$ frame may be longer than a second luminance recovery period RTME2 of the $N^{th}$ frame.

In the variable frame frequency environment where a length of a luminance recovery period varies more based on a frame frequency as well as a relative position of a sensing pixel group line, it is unable to predict the length variation of the luminance recovery period based on a variation of the frame frequency, and due to this, it is impossible to apply the SLC technology. This will be additionally described below.

The timing controller may determine a frame frequency of each frame with reference to the input data enable signal DE transferred from the host system, instead of separately receiving information about a variable frame frequency from the host system. In a specific frame, the timing controller may determine a transition period of the input data enable signal DE (i.e., a period where there are pulses generated alternately between a logic low voltage and a logic high voltage) as a vertical active period Vactive of a corresponding frame and may determine a non-transition period of the input data enable signal DE (i.e., a period where only the logic low voltage is maintained without the pulses) as a vertical blank period Vblank of a corresponding frame.

However, the timing controller may not know a vertical blank period Vblank of the $N-1^{th}$ frame until a first pulse of the input data enable signal DE starts to rise in the $N^{th}$ frame, and moreover, may not know a vertical blank period Vblank of the $N^{th}$ frame until a first pulse of the input data enable signal DE starts to rise in the $N+1^{th}$ frame. In other words, the timing controller may not predict a length variation of the first luminance recovery period RTME1 based on a frame frequency (J Hz) of the $N-1^{th}$ frame, and due to this, it may be difficult to apply an appropriate luminance compensation gain to the first luminance recovery period RTME1. Likewise, the timing controller may not predict a length variation of the second luminance recovery period RTME2 based on a frame frequency (K Hz) of the $N^{th}$ frame, and due to this, it may be difficult to apply an appropriate luminance compensation gain to the second luminance recovery period RTME2.

When a length deviation of the first and second luminance recovery periods RTME1 and RTME2 corresponding to the same sensing pixel group line is not compensated for based on an appropriate luminance compensation gain, the sensing pixel group line may be recognized as line dim.

Figure 15:
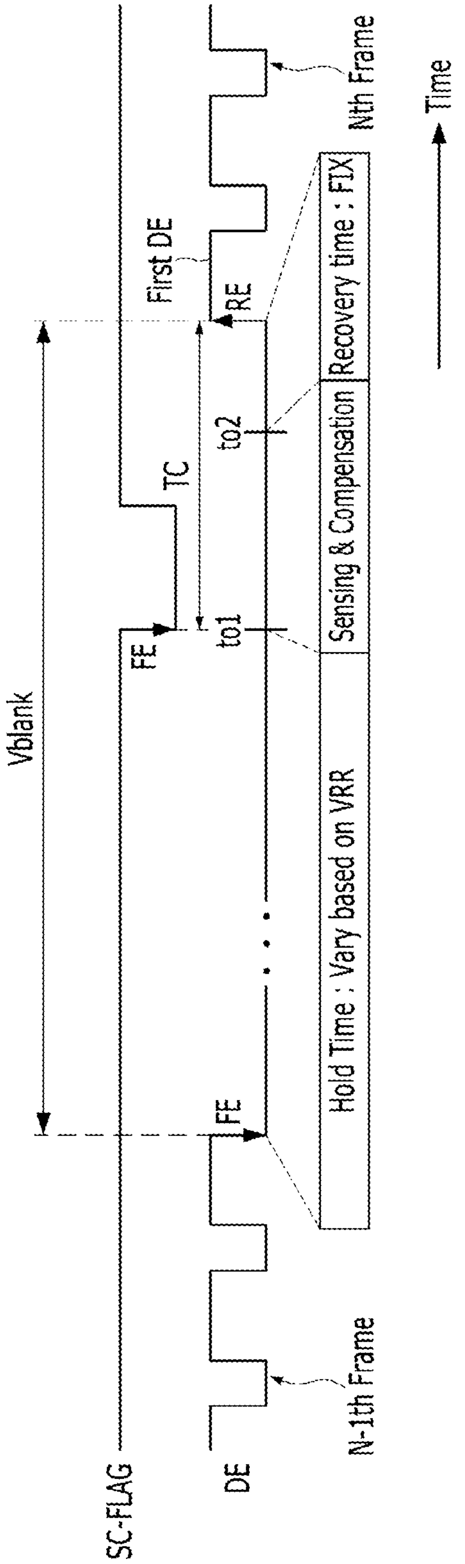
FIG. 15 is a diagram illustrating an example where a sensing period is set with reference to a rendering completion signal in a vertical blank period, in an embodiment of the specification.

FIG. 15 is a diagram illustrating an example where a sensing period is set with reference to a rendering completion signal in a vertical blank period, in an embodiment of the specification. Also, FIG. 16 is a diagram illustrating an example where a length of a luminance recovery period corresponding to the same pixel group line is fixed regardless of a variation of a frame frequency, when a sensing period is set as in FIG. 15.

Referring to FIG. 15, a timing controller according to an embodiment of the specification sets a sensing period on the basis of a rendering completion signal SC-FLAG transferred from a host system in a vertical blank period Vblank of an $N-1^{th}$ frame. The rendering completion signal SC-FLAG is pulsed at a time which is a certain time TC earlier than an end time of the vertical blank period Vblank, and a sensing period is set based on a pulsing edge of the rendering completion signal SC-FLAG. Here, the pulsing edge denotes a rising edge or a falling edge, and an end time of the vertical blank period Vblank is synchronized with a rising edge RE of a first data enable signal of an $N^{th}$ frame. Also, a length of the certain time TC is fixed regardless of a variation of a frame frequency and has a fore period and a latter period.

Figure 16:
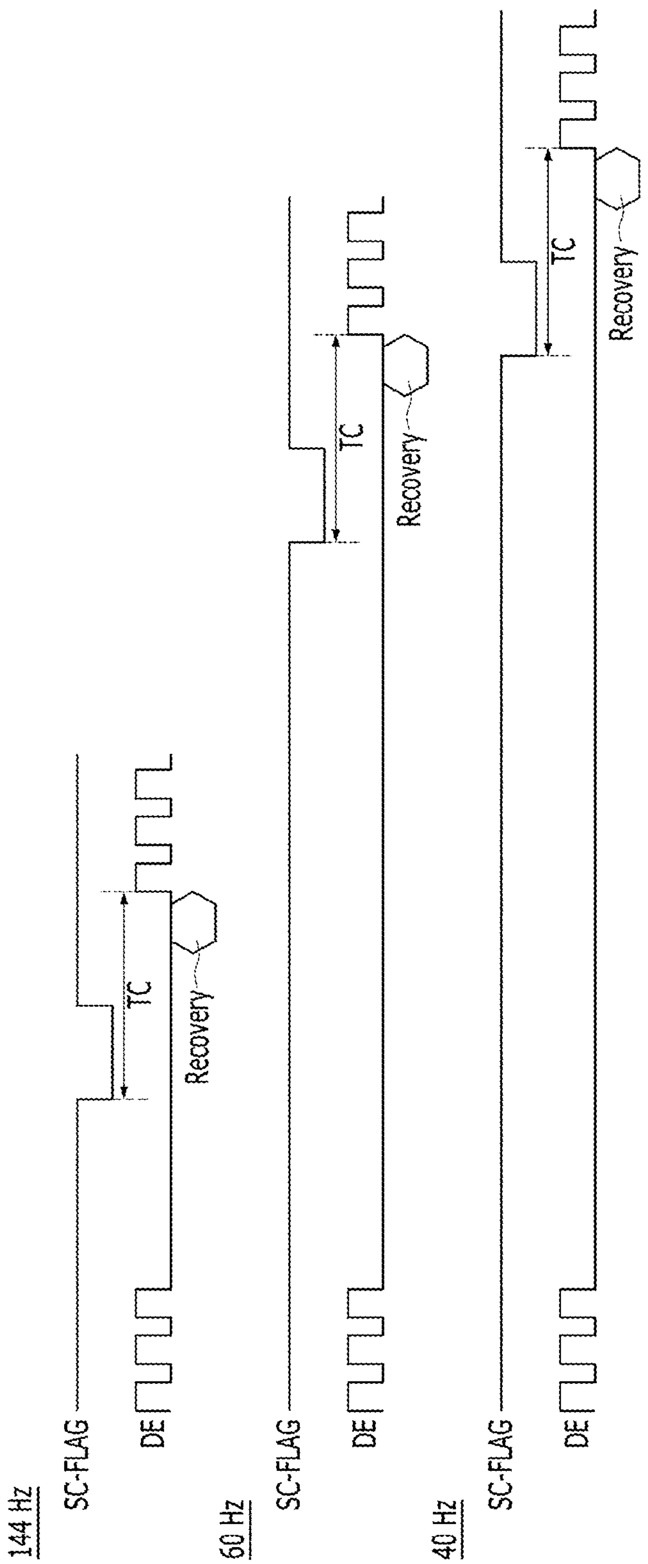
FIG. 16 is a diagram illustrating an example where a length of a luminance recovery period corresponding to the same pixel group line is fixed regardless of a variation of a frame frequency, when a sensing period is set as in FIG. 15.

The timing controller allocates a fore period t01 to t02 as a sensing period and allocates a latter period t02 to RE as a luminance recovery period in the certain time TC having a fixed length, and thus, as in FIG. 16, a length of a luminance recovery period corresponding to the same pixel group line is not changed by a variation of a frame frequency. A first timing t01 may be synchronized with a falling edge FE of the rendering completion signal SC-FLAG.

The timing controller allocates, as an image hold period, a period other than the fixed certain time TC in the vertical blank period Vblank. A start time of the image hold period in the vertical blank period Vblank may be synchronized with a falling edge FE of a last data enable signal of an $N-1^{th}$ frame.

A length of the image hold period may vary based on a rate of the frame frequency, and thus, may be defined as a variable period in the vertical blank period Vblank. On the other hand, a length of the certain time TC including the sensing period may be fixed regardless of the rate of the frame frequency, and thus, the certain time TC may be defined as a fixed period in the vertical blank period Vblank. The variable period may be disposed between the falling edge FE of the last data enable signal included in the $N-1^{th}$ frame and the falling edge FE of the rendering completion signal SC-FLAG, and the fixed period may be disposed between the falling edge FE of the rendering completion signal SC-FLAG and a rising edge RE of the first data enable signal included in the $N^{th}$ frame.

Figure 17:
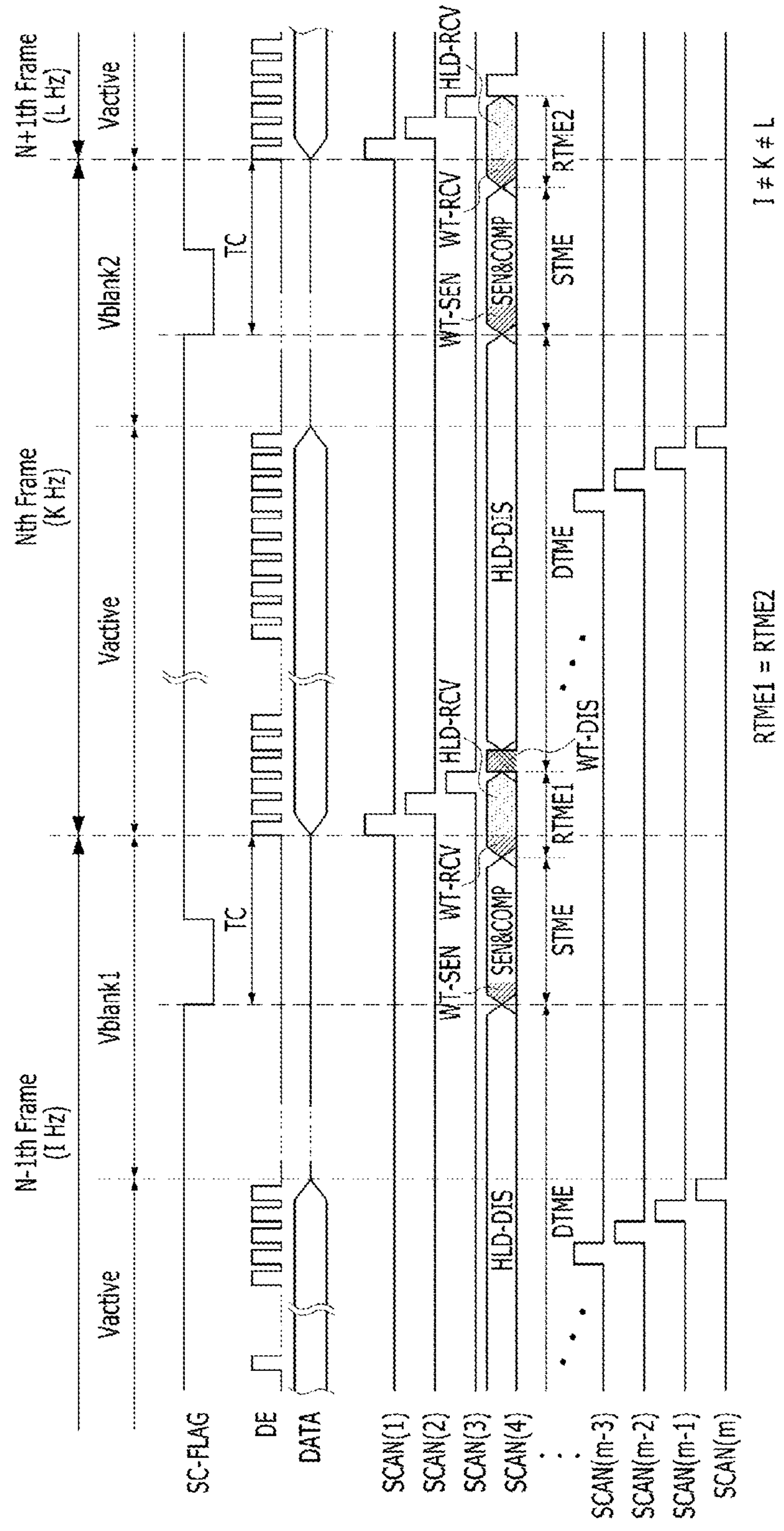
FIG. 17 is a diagram illustrating another example where a length of a luminance recovery period corresponding to the same pixel group line is fixed regardless of a variation of a frame frequency, when a sensing period is set as in FIG. 15.

FIG. 17 is a diagram illustrating another example where a length of a luminance recovery period corresponding to the same pixel group line is fixed regardless of a variation of a frame frequency, when a sensing period is set as in FIG. 15. Also, FIG. 18 is a diagram showing a driving timing of a scan signal and a data voltage applied to a sensing pixel group line.

Figure 18:
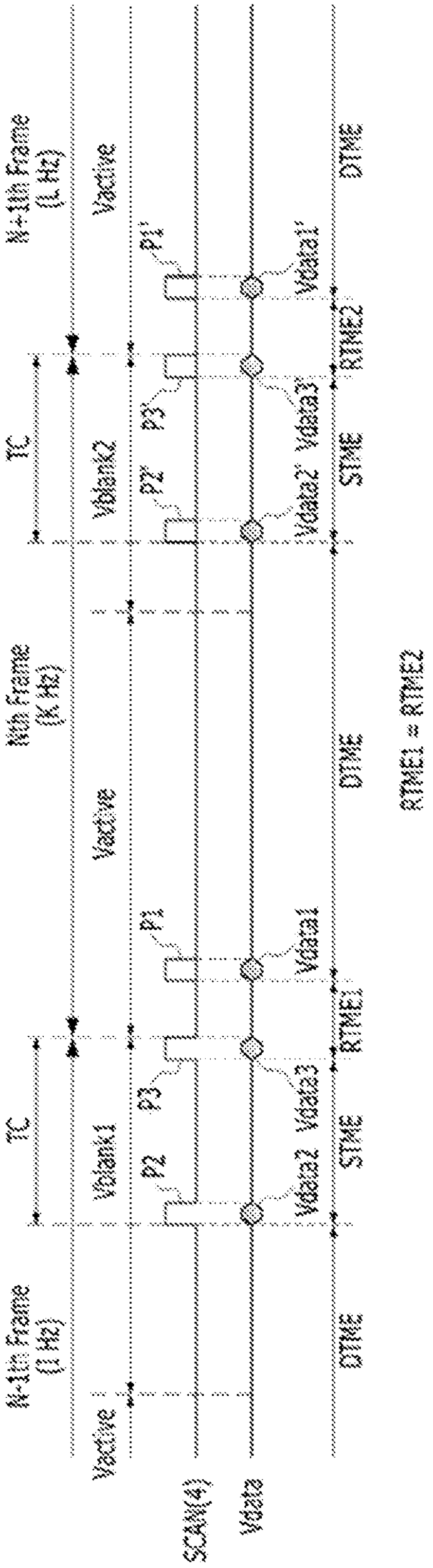
FIG. 18 is a diagram showing a driving timing of a scan signal and a data voltage applied to a sensing pixel group line.

Referring to FIGS. 17 and 18, the electroluminescence display device according to an embodiment of the specification may be for preventing a user from recognizing a position of a compensation pixel even when a frame frequency varies based on an input image in a process of compensating for an electrical characteristic deviation between pixels on the basis of an external compensation method. In other words, in the electroluminescence display device according to an embodiment of the specification, in a case where the SLC technology is applied in the variable frame frequency environment, a length of a luminance recovery period corresponding to the same pixel group line may be constant, regardless of a variation of a frame frequency, and thus, a sensing pixel group line may be prevented from being recognized as line dim.

As in FIGS. 17 and 18, in a variable frame frequency environment where N−1$^{th}$ to N+1$^{th}$ frames have different frame frequencies (for example, "I Hz", "K Hz", and "L Hz"), the timing controller may set a length of a first luminance recovery period RTME1 in an N$^{th}$ frame and a length of a second luminance recovery period RTME2 in an N+1$^{th}$ frame so as to be constant regardless of a variation of a frame frequency. This is possible because a sensing period STME is disposed in a certain time TC with respect to a rendering completion signal SC-FLAG.

An operation of an electroluminescence display device in a variable frame frequency environment will be briefly described below with reference to FIGS. 17 and 18 in conjunction with FIG. 1. Here, it is assumed that target pixels disposed in a fourth pixel group line is sensing-driven.

The timing controller 11 receives a rendering completion signal SC-FLAG from the host system 14 in a vertical blank period Vblank1 of an N−1$^{th}$ frame, sets a sensing period STME on the basis of the rendering completion signal SC-FLAG in the vertical blank period Vblank1, and outputs second gate and data control signals GDC and DDC needed for sensing driving and third gate and data control signals GDC and DDC needed for luminance recovery driving of the panel driving circuits 121 and 13.

In the sensing period STME, the panel driving circuits 121 and 13 generate a second data voltage Vdata2 for sensing driving on the basis of the second gate and data control signals GDC and DDC and a sensing scan signal P2 synchronized with the second data voltage Vdata2. In the sensing period STME, the panel driving circuits 121 and 13 apply (WT-SEN operation) the second gate and data control signals GDC and DDC and the sensing scan signal P2 to target pixels to sensing-drive the target pixels. In the sensing driving, driving elements included in the target pixels perform an on operation on the basis of the second data voltage Vdata2, but light emitting devices included in the target pixels do not emit light. In the sensing period STME, the sensing circuit 122 senses an electrical characteristic (a threshold voltage and/or mobility) of the driving elements included in the target pixels.

The panel driving circuits 121 and 13 generate a third data voltage Vdata3 for a luminance recovery driving and a luminance recovery scan signal P3 synchronized with the third data voltage Vdata3 on the basis of third gate and data control signals GDC and DDC in a first luminance recovery period RTME1 succeeding the sensing period STME. The third data voltage Vdata3 for the luminance recovery driving is a data voltage to which a luminance compensation gain is applied for compensating for luminance loss caused by non-emission during the sensing period STME. The luminance compensation gain is previously set by units of one or more pixel group lines on the basis of a method illustrated in FIGS. 12A and 12B. The panel driving circuits 121 and 13 supply the target pixels with the third data voltage Vdata3 to which the luminance compensation gain is applied and the luminance recovery scan signal P3 in the luminance recovery period RTME of the N$^{th}$ frame (WT-RCV operation) to luminance-recovery-drive the target pixels (HLD-RCV operation). Such a WT-RCV operation is performed in a first vertical blank period Vblank1 of an N−1$^{th}$ frame, and the HLD-RCV operation is performed until a display scan signal P1 is applied to the target pixels, in a vertical active period Vactive of an N$^{th}$ frame.

The timing controller 11 receives a data enable signal DE and rendering image data DATA of the N$^{th}$ frame from the host system 14 in a vertical active period Vactive of the N$^{th}$ frame and generates first gate and data control signals GDC and DDC needed for display driving of the panel driving circuits 121 and 13. The timing controller 11 outputs the first gate and data control signals GDC and DDC and the rendering image data DATA of the N$^{th}$ frame to the panel driving circuits 121 and 13. The panel driving circuits 121 and 13 supply the target pixels with a first data voltage Vdata1 and a display scan signal P1 in the vertical active period Vactive of the N$^{th}$ frame (WT-DIS operation) to display-drive the target pixels (HLD-DIS operation). Such a WT-DIS operation is performed in the vertical active period Vactive of the N$^{th}$ frame, and the HLD-DIS operation is maintained until a rendering completion signal SC-FLAG is received, in a vertical blank period Vblank2 of an N+1$^{th}$ frame.

According to the present embodiment, a length of a luminance recovery period RTME 1 or RTME2 corresponding to the same pixel group line may be constant regardless of a variation of a frame frequency. This is because the timing controller 11 controls a panel driving circuit so that sensing driving is performed in a fixed period of a vertical blank period, on the basis of the rendering completion signal SC-FLAG.

According to the present embodiment, because a length of a luminance recovery period is merely changed based on the order in which display scan signals SCAN(1) to SCAN(m) are supplied and is not changed based on a variation of a frame frequency, the timing controller 11 may select a luminance compensation gain suitable for a length of the luminance recovery period and may supply the luminance compensation gain to the panel driving circuits 121 and 13 on the basis of the method illustrated in FIGS. 12A and 12B. Therefore, the panel driving circuits 121 and 13 may generate a third data voltage to which an appropriate luminance compensation gain is applied and may apply the generated third data voltage to pixels of a sensing pixel group line, thereby preventing the sensing pixel group line from being recognized as line dim.

According to the present embodiment, when frame frequencies of a first frame and a second frame which are continuous differ, a length of a vertical active period where a data enable signal is pulsed in one frame is the same in the first frame and the second frame. On the other hand, a length of a vertical blank period where the data enable signal is not pulsed in one frame differs in the first frame and the second frame.

In the present embodiment, a display period DTME and a luminance recovery period RTME1 or RTME2 are disposed with a sensing period STME therebetwen. Here, the sensing period STME and the luminance recovery period RTME1 or RTME2 correspond to the same pixel. The display period DTME may be referred to as a first emission period, and the luminance recovery period RTME1 or RTME2 may be referred to as a second emission period. The luminance of the second emission period is higher than that of the first emission period so that luminance loss during the sensing period STME is compensated for. This is possible because a luminance compensation gain is applied. Based on such differential luminance implementation, a luminance deviation between a sensing pixel and a non-sensing pixel is reduced. In other words, a sensing pixel group line is not recognized as line dim on the basis of a cognitive integral effect based on differential luminance implementation.

Figure 19:
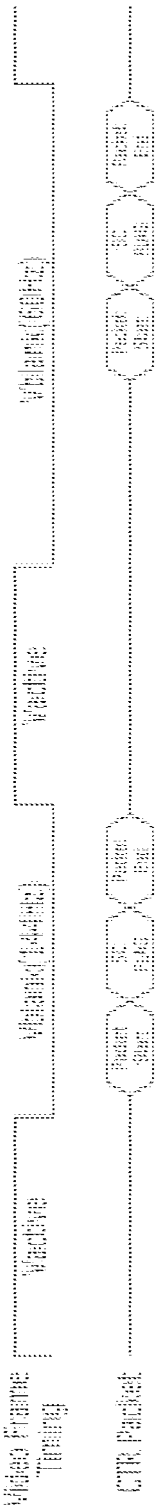
FIG. 19 is a diagram illustrating a control data packet transferred from a host system to a timing controller in a vertical blank period.

FIG. 19 is a diagram illustrating a control data packet transferred from a host system to a timing controller in a vertical blank period.

Referring to FIG. 19, the host system may process a rendering completion signal SC-FLAG into a control data packet and may transfer the processed rendering completion signal SC-FLAG. The rendering completion signal SC-FLAG may be packetized by a packet start signal and a packet end signal and transferred, and thus, signal distortion occurring in a transfer process may be minimized.

While the present disclosure has been particularly shown and described with reference to exemplary embodiments thereof, it will be understood by those of ordinary skill in the art that various changes in form and details may be made therein without departing from the spirit and scope of the present disclosure.

The invention claimed is:

1. A display device comprising:

a display panel including a pixel including a driving transistor and a light emitting device;

a graphics processor configured to render image data, which is to be applied to the pixel, change a length of a vertical blank period, and output a rendering completion signal prior to outputting the rendered image data;

a timing controller configured to set a sensing period on the basis of the rendering completion signal in the vertical blank period; and a sensing circuit configured to sense an electrical characteristic of the driving transistor in the sensing period, wherein the sensing period starts at a first timing which is a predetermined time earlier than an end time of the vertical blank period, and ends at a second timing between the first timing and the end time of the vertical blank period, and wherein a length of the predetermined time is constant regardless of a length variation of the vertical blank period, and is longer than a length of the sensing period.

2. The display device of claim 1, wherein the graphics processor is configured to fix a length of a vertical active period where a data enable signal is pulsed, in one frame, and the graphics processor is configured to change a length of the vertical blank period where the data enable signal is not pulsed, in the one frame.

3. The display device of claim 2, further comprising a panel driving circuit configured to supply the pixel with a first data voltage for display driving and a display scan signal synchronized with the first data voltage in the vertical active period, and configured to supply the pixel with a second data voltage for sensing driving and a sensing scan signal synchronized with the second data voltage in the sensing period.

4. The display device of claim 3, wherein the panel driving circuit is further configured to supply the pixel with a luminance recovery period between a pulsing edge of the display scan signal and a second timing at which the sensing period ends, the luminance recovery period configured to compensate for luminance loss caused by non-emission during the sensing period, and wherein a length of the luminance recovery period corresponding to the pixel is fixed regardless of a variation of the vertical blank period.

5. The display device of claim 4, wherein the panel driving circuit is further configured to supply the pixel with a third data voltage to which a luminance compensation gain is further applied and a luminance recovery scan signal synchronized with the third data voltage, in the luminance recovery period.

6. The display device of claim 5, wherein the pixel is included in one of a plurality of pixel group lines to which the display scan signal is sequentially supplied, and in a same frame, a length of the luminance recovery period is longer in a second pixel group line than a first pixel group line, wherein a supply order of the display scan signal for the first pixel group line is earlier than a supply order of the display scan signal for the second pixel group line.

7. The display device of claim 6, wherein a luminance compensation gain corresponding to the first pixel group line is greater than a luminance compensation gain corresponding to the second pixel group line.

8. The display device of claim 2, wherein an end time of the vertical blank period is set based on a rising edge of a first data enable signal of a subsequent frame.

9. The display device of claim 1, wherein the sensing period is set based on a pulsing edge of the rendering completion signal synchronized with the first timing.

10. A display device comprising:

a display panel including a pixel including a driving transistor and a light emitting device;

a timing controller configured to set a sensing period on the basis of a rendering completion signal in a vertical blank period; and a sensing circuit configured to sense an electrical characteristic of the driving transistor in the sensing period, wherein the vertical blank period comprises a variable period where a length thereof changes based on a rate of a frame frequency and a fixed period where a length thereof is fixed regardless of the rate of the frame frequency, and the sensing period is included in the fixed period, wherein the sensing period starts at a first timing earlier than an end time of the vertical blank period by the fixed period, and ends at a second timing between the first timing and the end time of the vertical blank period, and wherein a length of the fixed period is longer than a length of the sensing period.

11. The display device of claim 10, further comprising a graphics processor configured to render image data, which is to be applied to the pixel, change the rate of the frame frequency, and output the rendering completion signal prior to outputting the rendered image data.

12. The display device of claim 10, wherein the variable period is disposed between a pulsing edge of the rendering completion signal and a falling edge of a last data enable signal included in a first frame, the fixed period is disposed between the pulsing edge of the rendering completion signal and a rising edge of a first data enable signal included in a second frame, and the second frame succeeds the first frame.

13. The display device of claim 12, wherein a length of a vertical active period, where the data enable signal is pulsed in one frame, is the same in the first frame and the second frame, and a length of the vertical blank period, where the data enable signal is not pulsed in the one frame, differs in the first frame and the second frame.

14. The display device of claim 12, wherein a frame frequency of the first frame differs from a frame frequency of the second frame.

15. The display device of claim 14, wherein the timing controller is configured to set the sensing period to be positioned between a first emission period and a second emission period corresponding to the pixel, a length of the first emission period differs in the first frame and the second frame, and a length of the second emission period is the same in the first frame and the second frame.

16. The display device of claim 15, wherein a luminance of the second emission period is higher than a luminance of the first emission period.

17. A driving method of a display device including a pixel including a driving transistor and a light emitting device, the driving method comprising:

rendering image data, which is to be applied to the pixel, changing a length of a vertical blank period, and outputting a rendering completion signal prior to outputting the rendered image data;

setting a sensing period on the basis of the rendering completion signal in the vertical blank period; and sensing an electrical characteristic of the driving transistor in the sensing period, wherein the sensing period starts at a first timing which is a predetermined time earlier than an end time of the vertical blank period, and a length of the predetermined time is fixed regardless of a length variation of the vertical blank period, and the sensing period ends at a second timing between the first timing and the end time of the vertical blank period, and wherein the length of the predetermined time is longer than a length of the sensing period.

18. A driving method of a display device including a pixel including a driving transistor and a light emitting device, the driving method comprising:

setting a sensing period on the basis of a rendering completion signal in a vertical blank period; and sensing an electrical characteristic of the driving transistor in the sensing period, wherein the vertical blank period comprises a variable period where a length thereof varies based on a rate of a frame frequency and a fixed period where a length thereof is fixed regardless of the rate of the frame frequency, and the sensing period is disposed in the fixed period, wherein the sensing period starts at a first timing earlier than an end time of the vertical blank period by the fixed period, and ends at a second timing between the first timing and the end time of the vertical blank period, and wherein a length of the fixed period is longer than a length of the sensing period.

* * * * *